No. 665,285.   Patented Jan. 1, 1901.
G. W. TURNER.
PNEUMATIC OIL PUMP.
(Application filed May 7, 1900.)
(No Model.)   2 Sheets—Sheet 1.
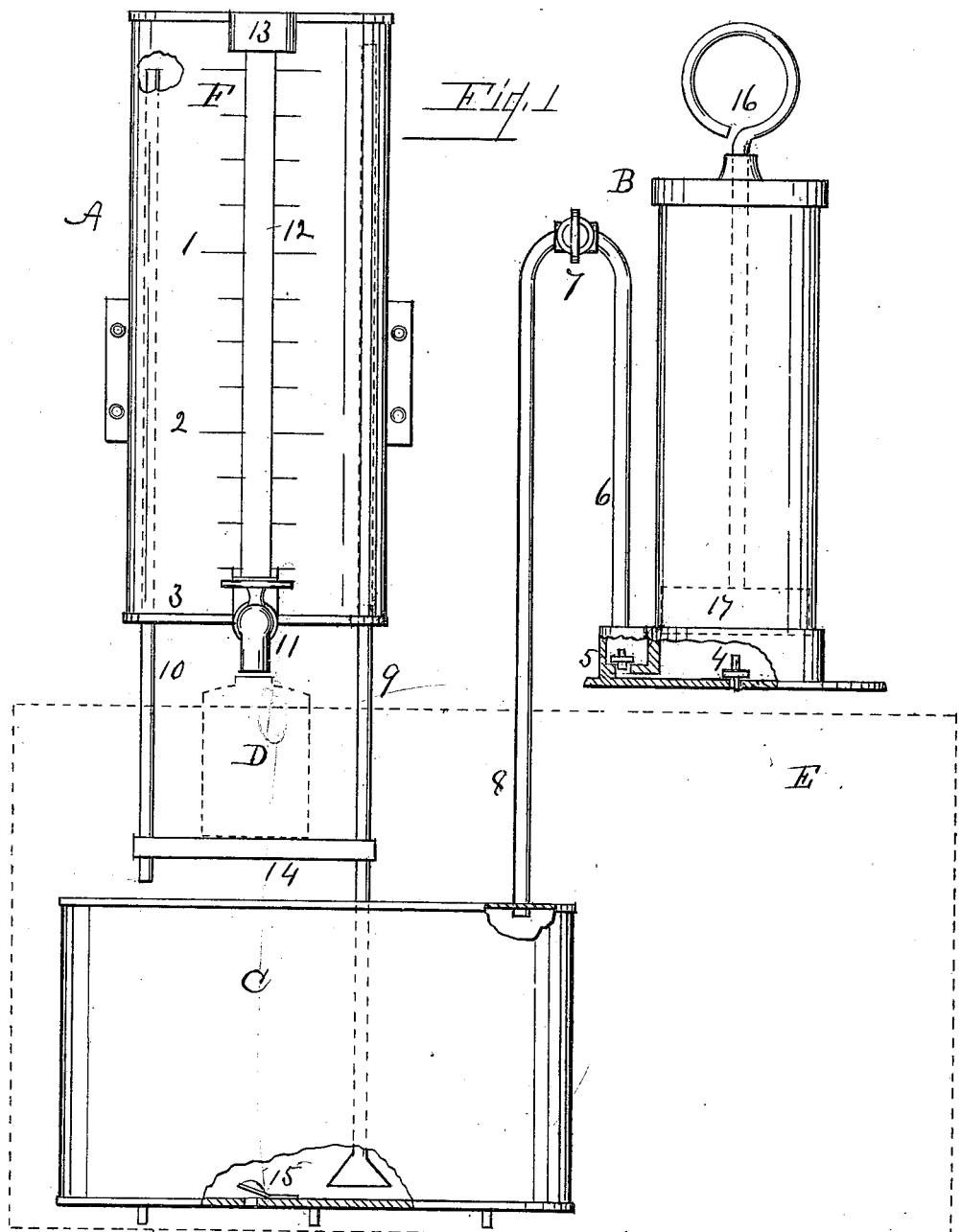
Witnesses
Horace S. Levy
L. F. Bapst
Inventor
George W. Turner
By B. Pickering
Attorney.

No. 665,285. Patented Jan. 1, 1901.
G. W. TURNER.
PNEUMATIC OIL PUMP.
(Application filed May 7, 1900.)
(No Model.) 2 Sheets—Sheet 2.
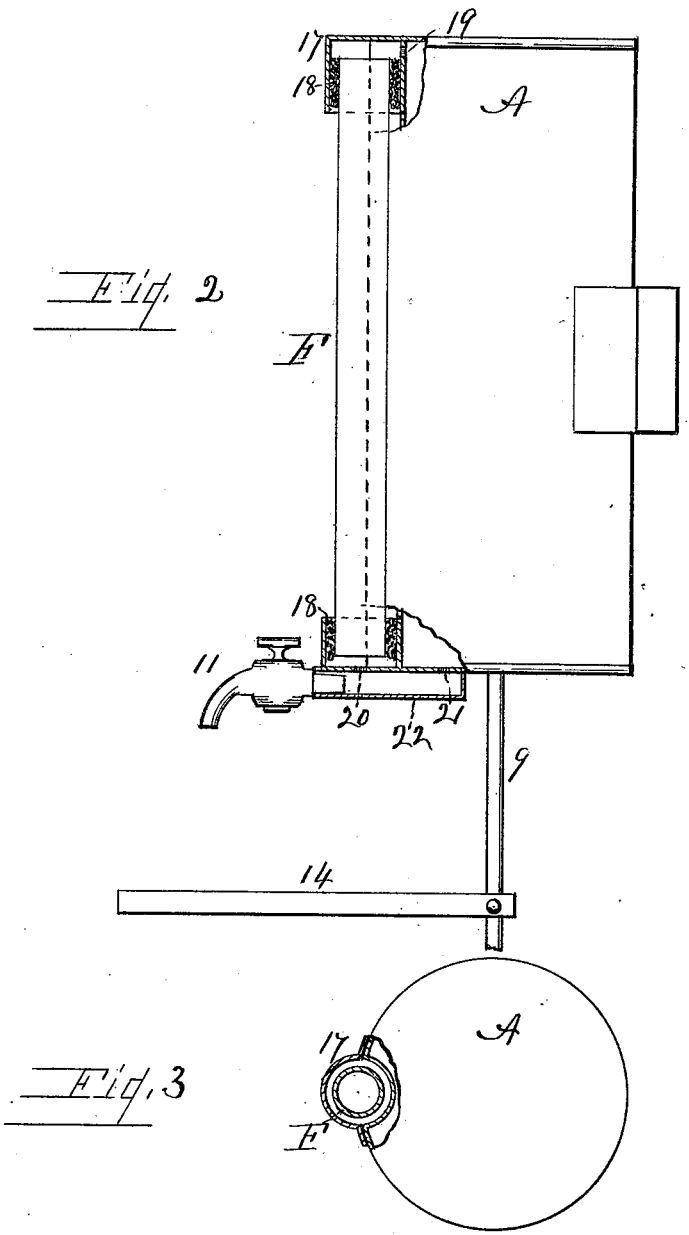
Witnesses
Harry G. Schurtz
Andrew P. Nicholds
Inventor
George W. Turner
By B. Pickering
Attorney.

United States Patent Office.

GEORGE W. TURNER, OF DAYTON, OHIO, ASSIGNOR OF ONE-HALF TO JOHN P. STEFFEN, OF SAME PLACE.

PNEUMATIC OIL-PUMP.

SPECIFICATION forming part of Letters Patent No. 665,285, dated January 1, 1901.

Application filed May 7, 1900. Serial No. 15,696. (No model.)

*To all whom it may concern:*

Be it known that I, GEORGE W. TURNER, a citizen of the United States, residing at Dayton, in the county of Montgomery and State of Ohio, have invented certain new and useful Improvements in Pneumatic Oil-Pumps; and I do hereby declare that the following is a full, clear, and exact description of the invention, which will enable others skilled in the art to which it appertains to make and use the same, reference being had to the accompanying drawings, and to the characters of reference marked thereon, which form a part of this specification.

My invention relates to improvements in pneumatic oil-pumps; and the apparatus consists of three principal parts—the air-pump, the measuring vessel, and the compression-chamber—with suitable conduits connecting the several parts.

The objects are to pump oil or gasolene into a building and measure the same without the use of separate measuring vessels.

The objects are attained by the apparatus illustrated in the accompanying drawings, in which—

Figure 1 is an elevation of the several parts of the apparatus with portions cut away to exhibit the interior. Fig. 2 is a side elevation of a measuring vessel with portions cut away. Fig. 3 is a top view of the same with a portion cut away.

The letters and numerals designate the several parts of the apparatus.

The tank E, in dotted lines, is to hold the oil or gasolene and may be of any desirable form or size of closed vessel and may be buried in the ground outside of the building. The tank must be adapted to receive the compression-chamber, and the conduits leading to the same must be made air-tight in the walls thereof. These conduits may be of any required length, and it is only necessary that the proper relations be maintained.

The air-pump B is constructed as usual and comprises the piston-rod 16, with handle portion, piston 17 (shown in dotted lines) the inlet-valve 4, and the outlet-valve 5. Over the latter valve is attached the pipe 6, which extends upwardly and is connected at its top with the downwardly-extended pipe 8 by the petcock 7, which is a two-way cock, one passage through in line and one opens on the side. The latter pipe enters the top of the compression-chamber C. Through these conduits the air enters said chamber when the pump is operated. The petcock is used to free the compression-chamber of air when required. The air-pump may be placed in any convenient position for use and fastened to the floor through its base or otherwise. The compression-chamber is an air-tight vessel having a capacity greater than that of the measuring vessel A. These two vessels are connected by the discharge-pipe 9, which extends from near the top of the measuring vessel and terminates in an enlarged end near the bottom of said compression-chamber, and the overflow-pipe 10, one end of which terminates near the top of the measuring vessel on a line with the top mark of the scale and the other terminates in the reservoir or tank. The measuring vessel is a closed vessel and is provided with the stop-cock 11 to draw off the liquid, and on its front surface is secured the glass tube F, that the height of the fluid may be observed. The same is formed of tin, with a semicircular recess from top to bottom. Semicircular plates 17 17 are soldered on at both ends, thus forming cups to receive the ends of the glass tube, and when the tube is placed in position melted sulfur is poured into said cups to make the ends fluid-tight. The top and bottom are extended to close these cups. The orifice 19 is provided for communication with the glass tube at the top, and orifices 20 and 21 through the bottom are provided for the same purpose. The semicircular tube 22 is soldered on the bottom, covering said orifices, and to the outer end of this is secured the stop-cock 11. A scale is secured beneath this tube, in which the transverse lines 1, 2, and 3 indicate gallons and the other divisions quarts. The dotted lines, Fig. 1, are the outline of a tank, which may be of any convenient form and should be air-tight.

The compression-chamber is placed within the same, and the pipes leading to the same must be made air-tight in the walls thereof. The compression-chamber C is provided with the clapper-valve 15, through the seat of which the oil flows in when there is no compression in the same. The shelf 14 is shown as sustained on the pipes, and on this is set the receiving vessel D, (shown in dotted lines.)

The operation is briefly thus: The air-pump is operated and the air is thereby forced into the compression-chamber, the same being filled with fluid by gravity, and the air pressing on the fluid causes the same to enter the measuring vessel through its conduit. When the vessel is full to the top of the overflow-pipe, the pumping ceases and through the petcock the air may be released, and if a gallon is to be drawn off the stop-cock is opened and closed when the gage-line 1 is reached in the descent of the fluid, as shown in the glass tube.

What I claim, and desire to secure by Letters Patent, is—

In a measuring apparatus the combination of the air-pump, the tank, the compression-chamber inclosed and resting on the bottom of said tank, the valve opening into said chamber and the conduit leading therefrom, and the overflow-conduit connecting top of the measuring vessel with the tank, substantially as shown and described.

In testimony that I claim the foregoing as my own I affix my signature in presence of two witnesses.

GEORGE W. TURNER.

Witnesses:
B. PICKERING,
W. H. H. ECKI.